United States Patent [19]

Werner et al.

[11] 3,993,520
[45] Nov. 23, 1976

[54] WINDSHIELD REPAIR APPARATUS AND METHOD

[75] Inventors: Frank D. Werner; Robert W. Wiele, both of Jackson, Wyo.

[73] Assignee: Frank D. Werner, Jackson, Wyo.

[22] Filed: Apr. 11, 1975

[21] Appl. No.: 567,384

Related U.S. Application Data

[63] Continuation of Ser. No. 467,110, May 6, 1974, abandoned.

[52] U.S. Cl. .................................... 156/94; 55/36; 55/159; 156/103; 156/104; 264/36; 425/13; 427/140; 428/63
[51] Int. Cl.² ........................................ B32B 35/00
[58] Field of Search ............... 156/94, 87, 103, 104; 264/36, 23; 427/140; 425/13; 428/63; 55/36, 159

[56] References Cited
UNITED STATES PATENTS 3,562,366  2/1971  Sohl ..................................... 264/36
3,765,975  10/1973  Hollingsworth ...................... 156/94

*Primary Examiner*—Edward G. Whitby
*Attorney, Agent, or Firm*—Dugger, Johnson & Westman

[57] ABSTRACT

An apparatus for repairing windshields and the method for using the apparatus wherein a liquid, curable resin material is forced into cracks in the windshield, using an apparatus mounted directly to the windshield, and which provides a high injection pressure and subsequently a vacuum so that the crack is completely filled, and air bubbles are removed from the filling resin during the time the resin cures. The apparatus in one form includes a disposable, simple-to-make injector that seals positively around the opening of the crack so that the resin is forced into place, and by reversing the injector, a suitable vacuum can be applied to the injected resin for removal of air bubbles.

17 Claims, 8 Drawing Figures

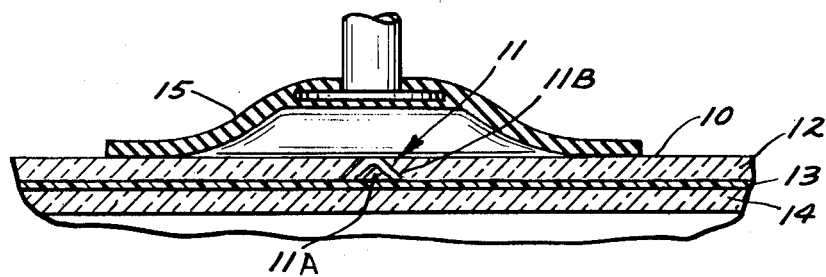
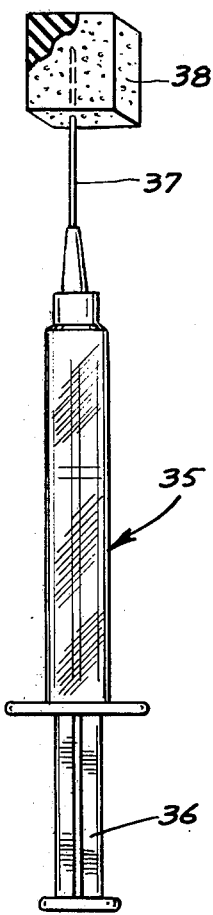
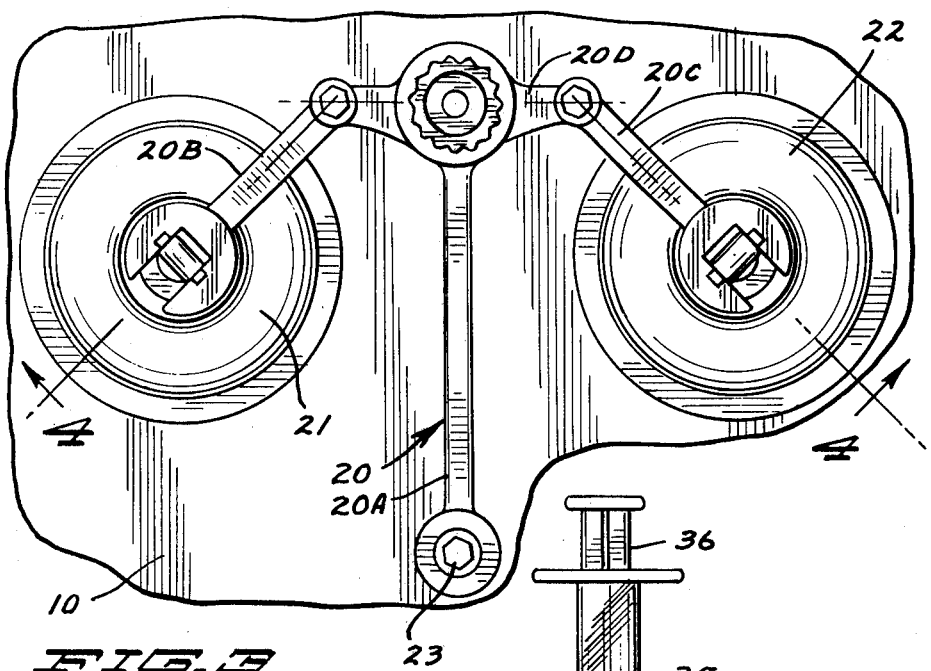
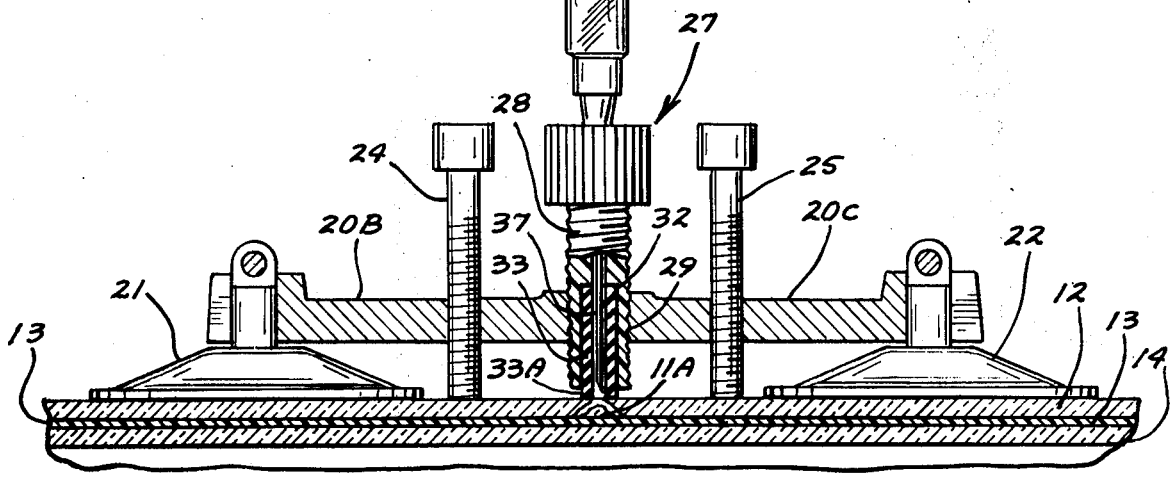

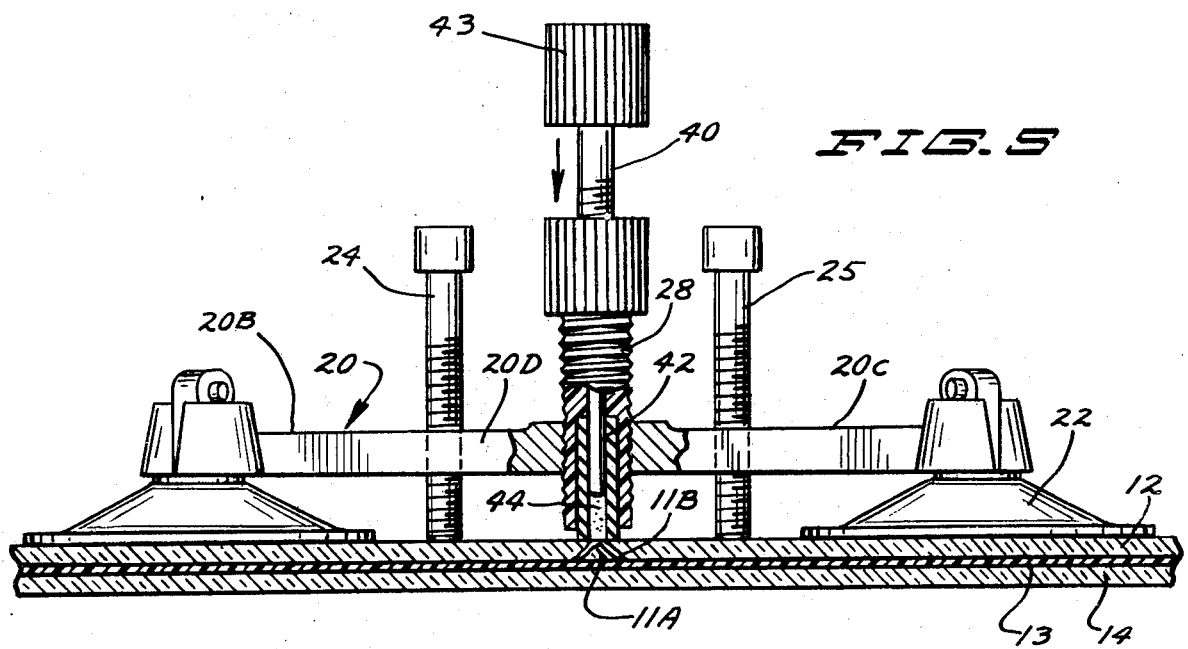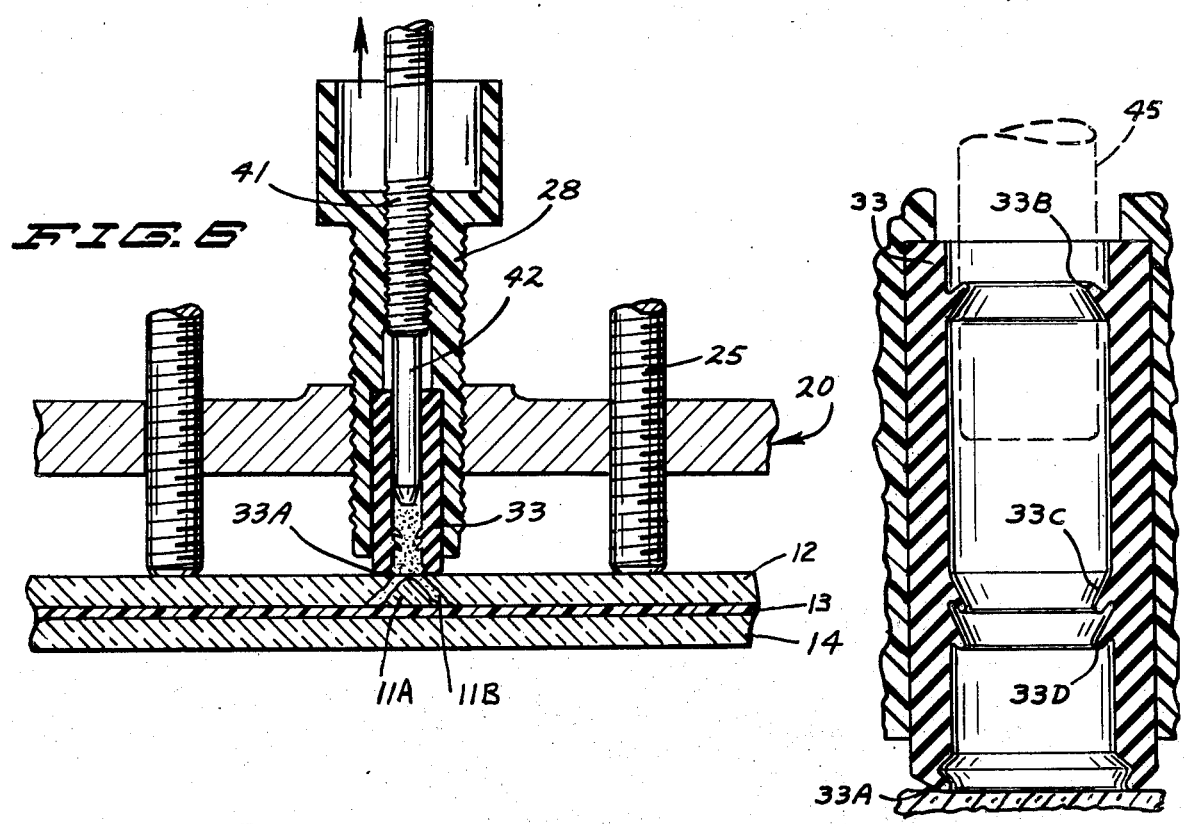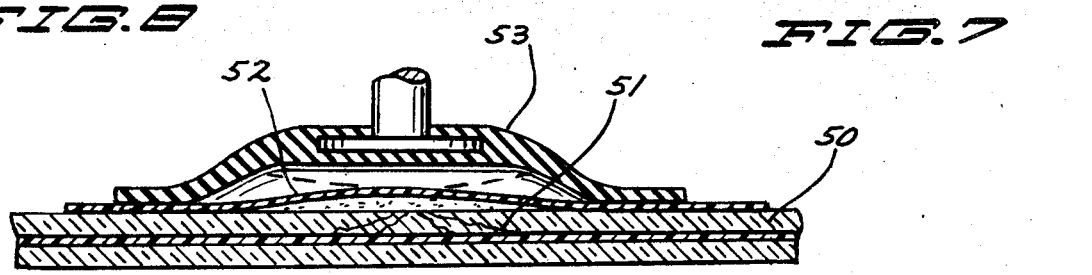

WINDSHIELD REPAIR APPARATUS AND METHOD

This is a continuation of application Ser. No. 467,110, filed May 6, 1974, now abandoned.

BACKGROUND OF THE INVENTION

1. Field of the Invention

The present invention relates to an apparatus for repairing cracked glass such as windshields in place on an automobile, and a method of using the apparatus.

2. Prior Art

In the prior art the repair windshield has been attempted, and prior methods are illustrated by U.S. Pat. Nos. 3,765,975 and U.S. Pat. No. 3,562,366. U.S. Pat. No. 3,562,366 deals with a method of sealing cracks in a windshield using ultrasonic vibrations to vibrate the area to cause filling of the open portion of the crack with a resin. U.S. Pat. No. 3,765,975 relates to filling windshield bulls-eye or pock mark cracks with a resin without the use of vibration, but including the use of a probe that mechanically pushes a broken portion of glass away from the crack area so that the crack will fill, and then subsequently subjecting the area to alternate negative and low positive pressures within a controlled temperature range.

SUMMARY OF THE INVENTION

The present invention relates to an apparatus of repairing windshields which mounts directly onto the windshield through the use of suction cups, and has a bridge member that holds an injector. The injector includes means for sealing around the break. The break or crack is dried out using acetone, and subsequently the injector is utilized for forcing a liquid resin into the break or crack at high pressure.

The resin is treated with a normal hypodermic syringe to remove air bubbles dissolved in the resin, and the hypodermic syringe is used for carefully placing the resin in the injector adjacent to the break to prevent air from being trapped inside the injector. The injector has a screw actuator which may be cycled between positions applying pressure and vacuum to the break during the curing process of the resin filling the crack.

For "star breaks" or in other words breaks that have radial cracks and are larger than the bulls-eye breaks, the resin may be placed under a section of polyethylene sheet, and forced into the crack while pressure is applied to the glass on the opposite side of the glass from the break to separate the cracks for admission of the resin. A vacuum cup may be used for alternate pressure and vacuum cycles.

The resin used can be of any suitable formulation that has substantially the same index of refraction as glass. The filling method set forth herein, and the apparatus, permit the injection of the resin under pressure, and the subsequent cycling between alternate pressure and vacuum cycles to remove bubbles, causes the closing of ordinary bulls-eye breaks without any substantial interference with vision in the area of the break. Further, by using the modified form of the apparatus, and the same principles of pressure and vacuum cycles, star breaks, or in other words breaks which have several radial break lines leading from a center, can be repaired satisfactorily.

The apparatus is quite simple to use, and includes low cost, replaceable parts which contact the resin so they can be disposed of after each repair. The injector for the bulls-eye type breaks seals positively on the windshield without any special provisions for other sealing devices or sealing material and in general permits a high pressure to be applied to the resin without leakage of resin between the windshield and the seal.

BRIEF DESCRIPTION OF THE DRAWINGS

FIG. 1 is a fragmentary sectional view taken through a windshield showing the first step in the windshield repair method of the present invention comprising the drying out of the crack;

FIG. 2 is a view of a hypodermic syringe used for injecting resin into the apparatus, and shown as it is being operated to remove air bubbles from the resin;

FIG. 3 is a top plan view of a bridge or support apparatus for an injector used for injecting the liquid epoxy materials into the break to be repaired on the windshield;

FIG. 4 is a sectional view taken as in line 4—4 in FIG. 3;

FIG. 5 is a side elevational view of the device in FIG. 4 with parts of section and parts broken away showing a step of injecting the resin into the crack to be repaired;

FIG. 6 is a view showing the injector when it is retracted to remove air bubbles from the resin filling the break to be repaired;

FIG. 7 is a sectional view of a plunger sleeve showing details of the sealing arrangement; and FIG. 8 is an alternate form of the method of applying pressure and vacuum to a spot to be repaired when a star break or larger crack is being repaired.

DESCRIPTION OF THE PREFERRED EMBODIMENT

Referring first to FIG. 3, a section of a windshield 10 is shown partially broken away, and the windshield has a crack which is to be repaired. The windshield shown is of the usual sandwich construction of two layers or sheets 12 and 14 of glass with a plastic layer 13 between the glass sheets. The first step to the repair, is shown in FIG. 1. A bulls-eye crack indicated generally at 11 is in the outer pane or sheet 12 of the glass. A bulls-eye break is repairable when it is localized in one pane or sheet of glass only. Usually a small cone shaped piece of glass will break out and compress the plastic layer 13. The crack or break 11 as shown comprises a bulls-eye break which has an inverted conically shaped member 11A broken out of the glass, and a space around this inverted member 11A is indicated 11B. A small hole or opening is broken out to the exterior of the windshield. This area in 11B is to be filled with the resin to hold the inverted cone shape 11A and prevent refraction of light at the gap.

This is a typical bulls-eye break, and it will be assumed that there are no radial cracks, or at least only very short ones. The bulls-eye break typically has a very small opening to the exterior surface of the outer pane 12, and the inverted cone radiates outwardly from that. Sometimes there are some tiny chips that fall out of the opening to the bulls-eye break, and before the break is to be repaired, these chips are cleared away by cleaning off the windshield with a brush or vacuum or the like to make sure that the chips have been removed. Then, it is important to make sure that the break opening 11B is dry and free of water. In many instances drying is not a necessary step, but if drying is necessary, a simple way of drying the break is to place acetone in the break 11 so that the space 11B is filled with acetone. It has been found that acetone will quickly creep into even a very small crack if applied to the outside of the crack, because of its very low viscosity and good wetting ability for glass. It is important that it will readily dissolve any water present. Next, a conventional suction cup 15 (FIG. 1) can be placed over the area of the windshield 10 so that the edges of the cup surround the break. If desired a small amount of lubricant that provides a good seal for the suction cup can be used on the windshield surrounding the break or on the edge (sealing lip) around the sunction cup. The suction cup can be operated in the conventional manner (there are many hand operated suction cups available) and the vacuum under the cup will cause the acetone to evaporate and carry water with it. If the break is relatively full of water the process can be repeated several times until it has been dried completely. The vacuum cup is preferably left in place for at least one minute on each suction stroke.

In a bulls-eye break it may be helpful to use a small wooden stirring stick or other member to push the conical member 11A away from the opening to the break to permit the acetone to enter into the crack 11B easily.

After the drying step has been carried out, referring specifically to FIG. 3, a support bridge indicated generally at 20 is mounted onto the windshield. The bridge is also shown in FIG. 4. The bridge is a member that has three legs, 20A, 20B and 20C joined together by center member 20D. The legs 20B and 20C each carry conventional suction cups 21 and 22, respectively, thereon. The suction cups can be attached to the legs 20B and 20C in any desired manner, and these cups can be forced down against the windshield 10 so that they will adhere tightly to the windshield. Leg 20A carries a cap screw 23 at the outer end thereof that is threadably adjustable in the usual manner and the end of which will engage the outer surface of the windshield. Likewise, the joining or cross member 20D has two cap screws 24 and 25, respectively threadably mounted therein and these cap screws can be tightened down against the windshield surface as shown in FIG. 4.

After the suction cups 21 and 22 are in place, the cap screws 23, 24 and 25 can be adjusted so that they will pull up slightly on the cups to provide a good force downwardly against the windshield, and also the cap screws can be used to adjust the angle of tilt of the general plane of the bridge member 20 to be parallel to the windshield. Use of a thin film of vacuum cup lubricant used under the suction cups 21 and 22 also permits these cups to be slipped along the windshield slightly for accurate positioning.

Center member 20D has an injector assembly indicated generally at 27 mounted therein. As shown the injector assembly includes an outer housing 28 that is threadably mounted as at 29 to the center member 20D, and outer housing 28 has an interior recess 32 in which a rubber sleeve 33 is mounted. The rubber sleeve has an end portion 33A that engages the outer surface of the pane 12 of the windshield 10, and is of diameter to surround the opening of the break 11. This member 28 can be threaded down by hand with sufficient force to compress the end 33A of the rubber sleeve 33 against the windshield for the desired sealing. The end 33A is flexible to form a seal means.

After the resin to be used has been mixed, a hypodermic syringe illustrated at 35 is filled with a desired amount of resin by removing plunger 36 from the barrel. The syringe is filled after pulling the plunger 36 out of the barrel of the syringe, and then pouring in resin or liquid repair material sufficient to fill the syringe barrel about half full of the mixed resin. The plunger 36 is then inserted into the barrel and the syringe is held with the needle 37 pointed upright. The plunger is then pushed in until all of the air is expelled, and a little resin oozes out of the end of the needle 37.

The needle 37 is forced into a small rubber block 38 that is provided for this purpose to close the needle opening. The plunger is pulled all the way back in the barrel and is held in that position to create a vacuum on the interior of the syringe. Large bubbles will form, which is air coming out of the resin mixture. The plunger is held retracted for perhaps several minutes, until most of the bubbles have gone to the top of the barrel and collapse. This is with the needle held upright as shown in FIG. 2. Then, the plunger is eased upward with the needle still pointing upright. When the plunger stops, the rubber block is removed from the needle, and any air bubbles that have been formed in the barrel are forced out of the syringe by pushing the plunger inwardly or toward the needle. They will not redissolve into the outgased resin, except very slowly. The resin in the syringe is then ready to be used.

The tip of the needle or syringe 35 is inserted into the opening in the housing 28 so that the needle tip, as shown in FIG. 4, is near the sheet of glass 12 and is at the bottom of the housing, and on the interior of rubber sleeve 33. As stated previously the housing 20 will be tightened down to cause the end 33A to seal against the glass. Then the syringe is emptied into sleeve 33 by pushing the plunger 36 in so that the injector assembly, and specifically the interior of the tube 33 is filled with resin without trapping any air at the bottom. For a normal bulls-eye break such as that shown, approximately 1cc of resin is used.

The needle and syringe are withdrawn from the housing 28 and the pressure screw 40 of the injector is inserted as shown in FIG. 5. This pressure screw 40 is threaded onto the interior of the housing 28 as perhaps best is seen in FIG. 5. The pressure screw has a threaded section 41, and an injector or plunger end 42 that fits inside the opening of the elastomeric sleeve 33. The screw 40 has a knurled end 43 that can be finger tightened to force it downwardly toward the windshield and in this way force the resin indicated generally at 44 in the lower end of the sleeve 33 into the gap or opening 11B surrounding the conical portion 11A in the break. This pressure that is exerted can be quite high because of the threaded mounting. The pressure would be in the range of 100 psi up to perhaps 5,000 psi. This forces the resin into the opening 11B surrounding the conical member 11A without any external vibration, such as ultrasonic vibration, and without any specific mechanical depression of the cone member 11A away from the opening to the break. In other words a good seal is provided with the end 33A of the elastomeric sleeve 33 around the opening of the break 11, and high enough pressures are supplied to force the resin into the crack.

The pressure is left on for several minutes, for example at least one minute and preferably approximately 2 to 5 minutes or more, so that the resin is forced into the crack, and the curing process starts. After the desired elapsed time the pressure screw 40 is backed up three or four revolutions, to form a vacuum under the plunger 42 of the screw inside the rubber sleeve. This vacuum then causes dissolved air or gas bubbles in the resin to leave the break. The vacuum cycle is maintained for 2 to 5 minutes or more.

FIG. 7 illustrates important details of the seal arrangement on sleeve 33 in relation to the plunger 42. The seals are important to insuring proper operation of the cycle just described, comprising pressure to force resin to enter the crack and vacuum to remove trapped air bubbles, together with adequate sealing against the glass. A problem is encountered if a piston (plunger 42) and cylinder (sleeve 33) of an ordinary, obvious type is used with only a single seal, such as an O-ring without further modification. With a single peripheral seal, the resin will be compressed when the plunger is forced into position as soon as the plunger passes the seal line, as expected. However, withdrawal of the plunger will create no vacuum because it will be immediately retracted above the seal line, unless first, a substantial volume of the resin has leaked out or has been removed so that the end of the plunger is allowed to move inwardly some distance beyond the seal line. This is because at the instant a pressure seal is formed between the plunger and the sleeve, pressure build-up starts, and upon withdrawal of the plunger, a vacuum is just ready to form at about the same plunger position, and upon any further withdrawal the seal is broken.

In FIG. 7, the sealing surfaces comprise lips 33B, 33C and 33D, which are annular lips molded into the elastomeric sleeve 33. Lip 33B is oriented so as to seal against the plunger when there is vacuum under the plunger (as the plunger is backed up), and to leak readily (permit material to move out of the sleeve) when there is pressure under the plunger. Thus, the plunger 42 can readily be forced inward past lip 33B causing trapped air and excess resin to leak up and out past lip 33B. Significant pressure build-up starts only as the end of the plunger passes 33C and lip 33D. The seal 33D is merely a redundant member to reduce probability of failure of the pressure seal. Now, when the plunger (which forms a piston) is withdrawn, lip 33B prevents inward leakage of air, because for its orientation and design and a good vacuum is formed under the plunger throughout its travel from the vicinity of lip 33C, to the vicinity of lip 33A. It is seen that the plunger has sufficient travel along the vacuum seal to act as a pump and create a substantial vacuum.

It is thus important to insure that the plunger can create both the pressure and the vacuum cycles that the plunger be permitted to move past the vacuum seal a substantial distance before pressure is created on the break, (so that it can be backed up to create a vacuum) and that air can be expelled on the next pressure stroke before pressure is again created. It should be noted that air which is withdrawn from the resin or crack does not necessarily have to be expelled. If a bubble remains under the plunger on a pressure stroke it will merely compress and may even redissolve, however such redissolved gas is not in the depth of the repaired break, but is in a harmless location, out under the piston. Thus, if the plunger is permitted to extend through the vacuum seal member or line a substantial distance before pressure is first built up, the plunger can be cycled between the pressure and vacuum strokes without further expulsion of air drawn from the resin or crack in the vacuum strokes. In other words, if only a single seal is used, such as an O-ring, some means must be provided to let excess resin and air bleed out of the sleeve until the plunger extends past the seal the desired distance so that the plunger can be retracted sufficiently to create the vacuum required.

A seal lip also forms end 33A and this lip is so oriented as to strongly resist outward leakage of resin, even for pressures of several hundred psi. However, the lip is also clamped against the glass with sufficient force so that on the vacuum cycle, it does not allow inward leakage of air.

Pressure and vacuum cycles can be repeated as desired in order to get as many bubbles out of the resin as possible, and of course the new pressure cycle will force in additional resin as is necessary.

After the resin has been cured, the bridge unit is removed, and the windshield is cleaned off. The resin will cure as time goes on, but the unit can be removed before complete curing, if desired.

For a larger break, a simple device shown in FIG. 8 can be utilized. For example, with a windshield 50 having a star break 51 therein where several radial cracks will go out from the center of the break. A ring of vacuum cup lubricant can be placed in a ring around the break and a sheet of polyethylene 52 can be placed over the break.

The vacuum cup lubricant helps to seal the edges. Before placing the polyethylene sheet over the break, several drops of resin are placed inside the ring of vacuum cup lubricant that surrounds the break, and then the polyethylene sheet is laid over the break before the resin is able to run down the windshield. Bubbles are pushed out from under the polyethylene by manually pushing on the polyethylene. While this is being done, surface tension forces resin into the crack. Then a suction cup 53 is placed over the break, and over the polyethylene sheet. The suction cup can be depressed generally as shown in dotted lines, and in this manner also tends to force the resin underneath the sheet into the crack under pressure. The vacuum cup can then be operated to create a vacuum, in a solid line position shown and left in that position for preferably 5 to 10 minutes. As soon as the vacuum is applied by the vacuum cup, the bridge member indicated generally 20 is placed on the inside or opposite surface of the windshield 50, using the injector assembly, but no resin. The injector is forced against the inside of the windshield 50 opposite the break 51 so that there is a force tending to bulge the windshield upwardly or toward the vacuum cup 53. The force causes the cracks of the star break to open slightly to facilitate removal of air and entry of the resin. Care must be taken to not apply too much force on the windshield because the ends of the cracks will lengthen if too much force is applied.

After the resin has entered the cracks, the bridge is removed from the inside of the windshield 50, which will cause the edges of the break or cracks to close onto the resin that had entered the cracks 51 and force out excess. The vacuum cup may be cycled more than once if desired and is removed by pulling up on the edge of polyethylene sheet indicated at 52. The polyethylene sheet can be laid back over the break for a few minutes to retain and hold the resin in place over the break and let any additional resin run into the crack. The windshield can then be wiped dry after the polyethylene is removed and a good repair will normally be achieved.

While temperature is important, the desired temperature varies somewhat with the resin used. It has been found that a suitable resin that has a viscosity of less than 150 centistokes is important, and a viscosity less than 25 centistokes is highly desirable. The resin itself should have an index of refraction equaling that of glass, or as near to that of glass as possible. The temperature should generally be at least about 65° F. for operating with most kinds of resin, and thus a heated area should be used in cold climates during the winter time. Extremely thin resins can be used at lower temperatures.

The actual resin utilized herein may be a suitable combination that is formulated as shown in the prior patents previously mentioned, or may be any resin of strength adequate to prevent the cracks from spreading, has sufficiently low viscosity, the correct index of refraction, cures in a reasonable time, will tolerate traces of water before curing, is highly resistant to water and weather after cure, does not react unfavorably with the plastic layer between the glass, is not excessively toxic, and is transparent. Many kinds of resin systems may be suitable such as polyester, alpha methyl (or ethyl) cyano acrylate, epoxy, urethane or alkyd.

Long vacuum cycle times distinguish the present process. Cycle time of several minutes for vacuum are used for insuring complete filling of the crack and removal of air bubbles from the liquid repair material.

The pressure applied with the screw threaded injector also is very high and can be applied for substantial lengths of time.

The simple means of applying cycles of pressure and vacuum also distinguish this method, as compared to the prior art use of pumps, ultrasonics, infrared, ultraviolet, etc.

Also, the addition of the simple method of using acetone (know for other drying purposes) for this particular drying operation, is often important in the practical application of this process.

Finally, the procedure of outgassing the resin is important, because when it has been outgassed, it is able to dissolve much of the trapped air, while at the same time, permitting a stronger vacuum to be formed to enhance bubble removal.

What is claimed is:

1. An apparatus for injecting a liquid repair material into a crack of a glass such as a windshield comprising an injector tube, a bridge member of size and shape to hold said injector tube over said crack, means to hold said bridge member in a spaced relationship to said windshield and adjacent said crack, means to mount said injector tube on said bridge member in position to overlie the crack and with an end of said injector tube adjacent portions of said windshield surrounding said crack, said injector tube including means to seal the end of said injector tube against said windshield, and means to force said liquid repair material 2. The combination as specified in claim 1 wherein said means to force said liquid repair material through the injector tube comprises a screw thread plunger member threadably movable with respect to said injector tube and being operative to force material through said tube when it is threaded.

3. The combination as specified in claim 1 wherein said means to support said injector tube comprises a mounting member of size to receive said injector tube, said injector tube being removably mounted with respect to said mounting member to permit disposal of said injector tube.

4. The combination as specified in claim 1 wherein said injector tube comprises an elastomeric member having an end that is compressible to form said means to seal against the windshield.

5. The combination as specified in claim 2 wherein said screw threaded member includes a plunger portion, seal means between said plunger and said injector tube, said seal means providing a pressure seal for inward movement of said pluner portion and a vacuum seal upon reverse movement of said plunger portion, and means to permit substantial inward movement of said plunger portion past the seal means providing a vacuum reverse movement of said plunger portion along said vacuum seal to form a vacuum under said plunger.

6. The combination as specified in claim 1, syringe means having a needle of length to place liquid repair material used in sealing said windshield near the bottom of said injector tube and adjacent said windshield.

7. A combination as specified in claim 1 wherein said bridge member means comprises suction cup means attached to said bridge member to engage a windshield to be repaired at at least two laterally spaced locations, and an adjustment screw threadably mounted to said bridge member at a third location spaced from said two spaced locations, said screw being operable to engage said windshield to permit adjusting the position of said bridge member relative to the windshield.

8. The combination as specified in claim 7 and means to engage said windshield and force said bridge member away from said windshield against the action of said suction cup means.

9. An injector injecting liquid material into a small opening from cracks in a windshield or glass comprising a support, means to attach said support to the windshield, portions of said support being spaced from said windshield, a first tubular member, a second disposable tubular member carried by said first tubular member, said second tubular member having resilient means positioned against said glass and surrounding said opening, means between said support and said second tubular member to force said second tubular member and said resilient means against said glass, and a threaded member mounted on aid first tubular member and having a portion extending into said second tubular member, said threaded member being threadable to create a pressure on liquid material on the interior of said second tubular member, and retractable to create a vacuum on the interior of said second tubular member.

10. The combination of claim 9 wherein said resilient means comprises an integral wall portion of said second tubular member.

11. The combination of claim 9 wherein said support comprises a bridge member having at least three points of support relative to the windshield, and means on at least one point of support to permit adjusting the distance between said windshield and said bridge member.

12. A method of repairing windshields or the like having cracks therein utilizing a liquid repair material for filling the crack which hardens upon curing comprising the steps of supporting an injector assembly over said crack on a windshield, sealing said injector assembly around the peripheral edges of said crack against uncracked portions of said windshield, placing liquid repair material over said crack, forcing the liquid repair material into said crack without mechanically moving loose portions of said cracked windshield, and creating a vacuum over said crack at a desired level for a cycle time of several minutes, and repeating the steps forcing of liquid repair material into the crack and vacuum cycle to fill the void volume of the crack, including the step of degasifying said liquid repair material prior to forcing the liquid material into the crack, said degasifying step comprising the steps of placing an amount of liquid repair material in a hypodermic syringe having a needle, blocking the outlet of said needle, creating a vacuum within the syringe and simultaneously placing said needle uprightly to let gas bubbles form by the vacuum rise toward the needle, and subsequently expelling the gas bubbles out of the needle.

13. The method of claim 12 wherein the step of forcing includes the step of applying pressure on the liquid repair material in the range of 100 to 5,000 pounds per square inch.

14. The method of repairing windshields or the like having cracks therein utilizing a liquid repair material for filling the crack which hardens upon curing comprising the steps of supporting an injector assembly over said crack on a windshield, sealing said injector assembly around the peripheral edges of said crack against uncracked portions of said windshield, placing liquid repair material over said crack, focing the liquid repair material into said crack with said injector assembly without mechanically moving loose portions of said cracked windshield, and creating a vacuum over said crack at a desired level for a cycle time of several minutes comprising the step of placing a suction cup in position on said windshield with the edges of the suction cup surrounding said crack, and creating said vacuum by operating said suction cup to create a vacuum on the crack, releasing the vacuum and repeating the vacuum and release cycles to fill the void volume of the crack with liquid repair material.

15. The method of claim 14 including the step of applying a mechanical force to an opposite side of said windshield from said suction cup to open said crack and let liquid repair material flow thereinto, and wherein said step of applying pressure comprises manually forcing liquid repair material into said crack.

16. The method as specified in claim 15 wherein a polyethylene sheet is placed over resin applied against said windshield, and said suction cup is mounted over said polyethylene sheet and against said windshield, and said pressure is applied by manually pushing on said polyethylene sheet before placing said suction cup on said windshield.

17. The method as specified in claim 12 and including the step of removing water from said crack prior to placing the liquid repair material in said crack.

\* \* \* \* \*

UNITED STATES PATENT AND TRADEMARK OFFICE
CERTIFICATE OF CORRECTION

PATENT NO. : 3,993,520
DATED : November 23, 1976
INVENTOR(S) : Frank D. Werner et al.

It is certified that error appears in the above-identified patent and that said Letters Patent are hereby corrected as shown below:

Column 2, line 32 star break should be --"star break"--. Column 7, line 23 "time" should be--times--; Column 7, line 54, (Claim 1, line 12) after material add --through said injector tube while said injector tube is held sealed against said windshield. Column 8, line 5, (Claim 5, line 3) after plunger insert --portion--; Column 8, line 11, (Claim 5, line 9) after "vacuum" insert --seal is provided to thereby permit--; Column 8, line 31, (Claim 9, line 1) after injector insert --apparatus for--; Column 8, line 42, (Claim 9, line 12) "aid" should be --said--. Column 9, line 23, (Claim 14, line 8) "focing" should be --forcing--.

Signed and Sealed this

Fifteenth Day of February 1977

[SEAL]

Attest:

RUTH C. MASON
*Attesting Officer*

C. MARSHALL DANN
*Commissioner of Patents and Trademarks*